United States Patent [19]

Duckworth et al.

[11] 4,143,312

[45] Mar. 6, 1979

[54] STABILIZED PLATFORMS

[75] Inventors: George Duckworth, Oadby; David R. James, Twyford, both of England

[73] Assignee: The Marconi Company Limited, Chelmsford, England

[21] Appl. No.: 782,384

[22] Filed: Mar. 29, 1977

[30] Foreign Application Priority Data

Nov. 15, 1976 [GB] United Kingdom ............... 47474/76

[51] Int. Cl.[2] .......................... B64C 17/06; H01Q 1/34

[52] U.S. Cl. .................................... 318/649; 244/165; 343/709

[58] Field of Search ..................... 343/705 S, 709, 710, 343/765, 766; 244/165, 181; 318/649

[56] References Cited

U.S. PATENT DOCUMENTS 2,700,106 1/1955 Taylor ................................. 343/766

FOREIGN PATENT DOCUMENTS 890264 2/1962 United Kingdom ..................... 343/765

OTHER PUBLICATIONS

Kaiser, J. and Cacciamani, E. R. *A Shipboard Satellite Communication Experiment,* In *International Conference on Satellite Systems for Mobile Comm. & Surveillance,* London, England, 13–15 Mar. 1973.

*Primary Examiner*—Craig E. Church
*Assistant Examiner*—Harry E. Barlow
*Attorney, Agent, or Firm*—Diller, Ramik & Wight

[57] ABSTRACT

The invention concerns stabilized platform arrangements of the kind utilized, for example, to carry a rotatable ship's radio antenna, which requires to be stabilized against pitch and roll. A control system is provided which includes means for relating error signals representative of deviations in pitch and roll to orthogonal axes fixed with respect to the antenna, by conversion to angular errors in two orthogonal planes, the elevation and cross elevation planes, containing the reference axis about which the antenna rotates.

11 Claims, 5 Drawing Figures

STABILIZED PLATFORMS

This invention relates to stabilised platform arrangements, that is to say, arrangements which include what is generally known as a platform upon which a directional radio antenna or like directional device (e.g. a television camera) may be mounted and which is stabilised against pitch and roll motion.

Figure 1:
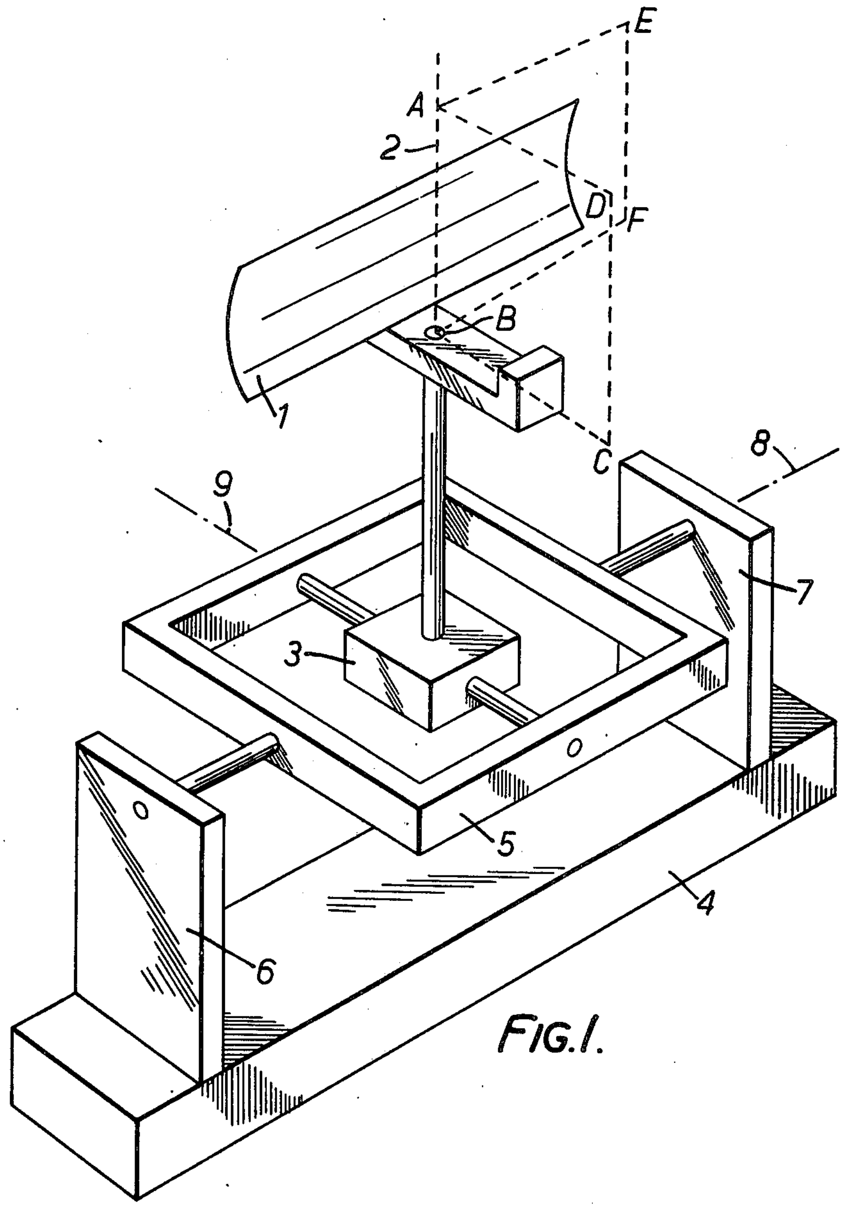
FIG. 1 is a schematic view of a conventional stabilized platform.

A typical stabilised platform arrangement is illustrated in highly schematic manner in FIG. 1 of the accompanying drawings.

Referring to FIG. 1, a radar antenna 1 is mounted to be rotated about the azimuth axis 2 upon a stabilised platform 3. The stabilised platform 3 is carried from the deck of a ship represented at 4 by a two axis gimbal system, consisting of a frame 5 carried from two supports 6 and 7 fixed to the deck of the ship 4. The frame 5 is mounted between the two supports 6 and 7 so as to be capable of rotation about a horizontal roll axis 8.

The stabilised platform 3 is mounted within the frame 5 so as to be rotatable about a horizontal pitch axis 9, the axes 8 and 9 being orthogonal.

To provide normal scanning in azimuth the antenna 1 is provided to be driven about the azimuth axis 2 by a motor (not shown) also carried by the stabilised platform 3.

To counteract pitch and roll, the stabilised platform 3 is rotated about the pitch axis 9 and the frame 5 is rotated about the roll axis 8 respectively, again by motors not shown under the control of pitch and roll error signals. These last mentioned pitch and roll error signals may be derived by comparing the output of data take-off devices, provided to measure the angle of rotation about each of the axes 8 and 9, with the angles of pitch and roll measured by the ship's normally provided vertical reference system. Alternatively, and as illustrated in FIG. 2, the pitch and roll error signals may be obtained directly by synchros provided on the gimbal system and coupled to the ship's vertical reference system.

Figure 2:
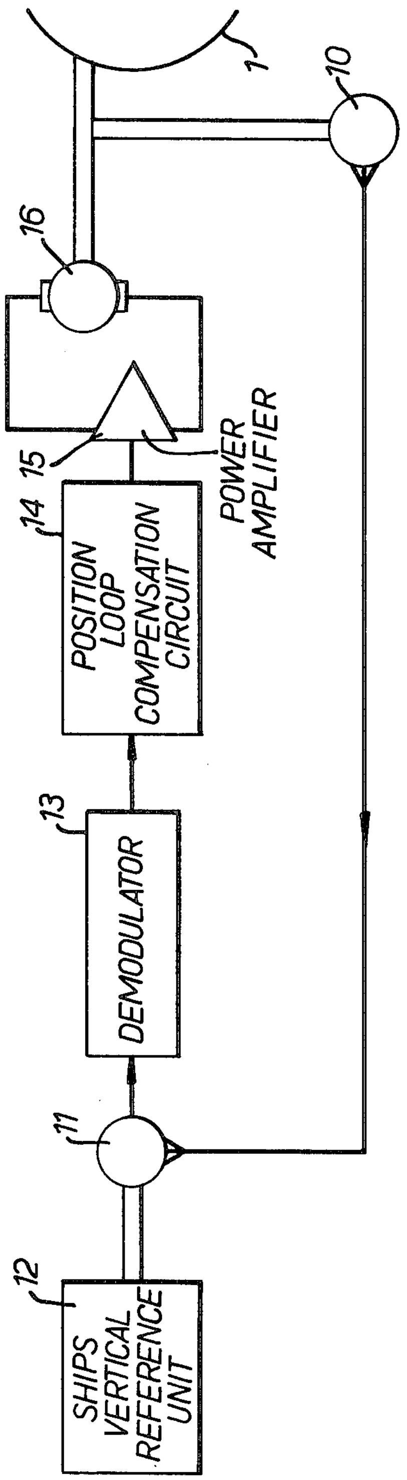
FIG. 2 is a schematic of the error signal detection and control system of FIG. 1.

Referring to FIG. 2, this is a schematic diagram of the error signal detection and control system provided in respect of one of the axes 8 and 9 of FIG. 1. For the purposes of explanation the diagram of FIG. 2 is taken to be the error signal detection and correction system in respect of roll, i.e. deviation about axis 8. A similar, independent, error signal detection and correction system is provided in respect of the pitch axis 9, but this is not represented.

Again the antenna is represented at 1. The synchro transmitter 10 is arranged to detect movement of the aerial 1 about the roll axis 8, i.e. movement of the frame 5 relative to the supports 6 and 7 about axis 8.

Synchro transmitter 10 provides an input to a control transformer 11 which is linked to the ship's vertical reference system represented by the block 12. Thus, the output of control transformer 11 is an a.c. error signal representative of roll. The output of control transformer 11 is applied to a demodulator 13, which converts the a.c. error signal to a d.c. error signal, which is applied to the input of a position loop compensation circuit 14.

Position loop compensation circuit applies compensated d.c. error signals to a power amplifier 15, which is connected to drive a motor 16, which is connected to drive the aerial 1 about the axis 8 in such a direction as to compensate for roll of the frame 5 about roll axis 8 due to effects such as unbalance, wind forces or gyroscopic forces.

As has already been mentioned, a similar, independent, error signal detection and correction system is provided in respect of the pitch axis 9. In this case however, the synchro transmitter corresponding to synchro transitter 10 is arranged to detect movement of the aerial 1 about the pitch axis 9, i.e. movement of the stabilised platform 3 relative to the frame 5 about the pitch axis 9. Also, the motor corresponding to motor 16 is connected to drive the aerial 1 about the axis 8 in such a direction as to compensate for pitch.

If the antenna 1 is stationary about the azimuth axis 2, or is rotating very slowly about the azimuth axis 2, the use of two separate error signal detection and control systems, as described, is satisfactory in controlling, on the one hand the roll and on the other the pitch of the platform 3 and hence the antenna 1.

However, in many cases, the antenna 1 is rotating with an angular momentum about the azimuth axis 2 which is dominant and this tends to reduce the effectiveness of the compensation for roll and pitch achieved with the known system as described above.

The present invention seeks to provide an improved stabilised platform arrangement in which the above difficulty is reduced.

According to one aspect of this invention, a control system for stabilising a member rotatable about a reference axis and carried from a body subject to angular deviations about two orthogonal axes (hereinafter referred to as pitch and roll axes) is provided wherein error signals representative of deviations in pitch and roll are related to orthogonal axes fixed with respect to said rotatable member by conversion to angular errors in two orthogonal planes containing said reference axis.

According to another aspect of this invention, an arrangement is provided comprising a member rotatable about a reference axis and carried by a body subject to angular deviations about two co-ordinate axes (hereinafter referred to as pitch and roll axes) and a control system comprising means for relating error signals representative of deviations in pitch and roll to orthogonal axes fixed with respect to said rotatable member by conversion to angular errors in two orthogonal planes containing said reference axis and means for utilising said error signals for compensating for deviations of said reference axis due to pitch or roll of said body.

Normally said reference axis is ideally vertical and said two orthogonal planes containing said reference axis are elevation and cross-elevation planes.

Said rotatable member may be any member required to be rotated in stabilised fashion, such as a scanning television camera, but preferably, said rotatable member is a radio or radar antenna.

Preferably said body which carries said rotatable member is a stabilisable platform which is mounted for movement about its pitch and roll axes and carried by carrier means provided to be fixed to a craft and said means for utilising said error signals for compensating for deviations of said reference axis due to pitch or roll of said body comprises means for driving said stabilised platform about said pitch and roll axes.

Said craft will normally be a surface craft such as a land vehicle or carriage or a sea going vessel.

Typically, said stabilisable platform is mounted in a double gimbal system carried by said carrier means, one gimbal axis corresponding to said pitch axis and the other gimbal axis corresponding to said roll axis.

In one embodiment of the invention where said craft is a sea going vessel having a vertical reference unit, as known per se, and said rotatable member is an antenna scannable in azimuth and rotatably mounted on a stabilisable platform, means are provided for determining the orientation of said stabilised platform in pitch and roll, comparison means are provided for comparing signals representing the orientation of said platform in pitch and roll with pitch and roll data derived from said ship's vertical reference unit to provide signals representative of angular deviations in pitch and roll of said platform relative to earth, means are provided for resolving said last mentioned pitch and roll deviation signals to signals representative of deviations in the elevation and cross-elevation planes of said antenna and means are provided for resolving said last mentioned deviation signals into signals representative of the torques required to be applied about the pitch and roll axes of the platform to provide compensate for pitch and roll of said platform.

Said above mentioned resolving means preferably comprises azimuth resolvers referenced to the vertical rotational axis of said antenna.

Said azimuth resolvers may be of the a.c. or d.c. kind, modulators and demodulators being provided as required to transpose the input signals thereto and the output signals therefrom from a.c. to d.c. and vice versa, as required.

Said resolving means may also be embodied as a micro-processor, synchro-to-digital converters being provided to translate the input thereto to digital signals and digital-to-analogue converters being provided to translate the digital output signals therefrom to analogue control signals, as required.

Normally prior to said second mentioned resolving means, position loop compensation means are provided as known per se in order to provide a degree of damping of the control system and reduce any tendency for oscillation to occur.

Figure 3:
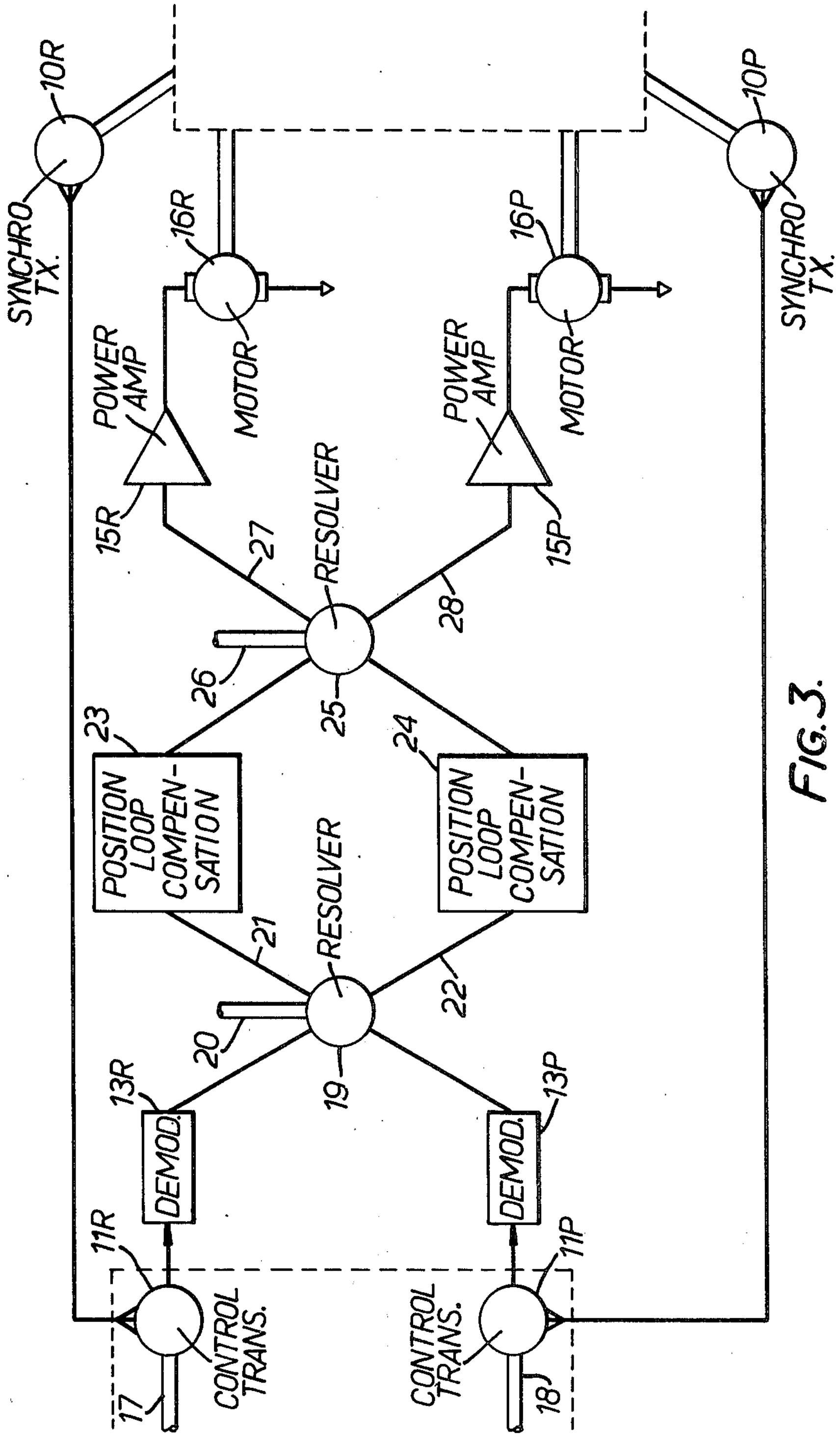
FIG. 3 is a schematic of an error detection and correction system according to this invention, using d.c. resolvers.
Figure 4:
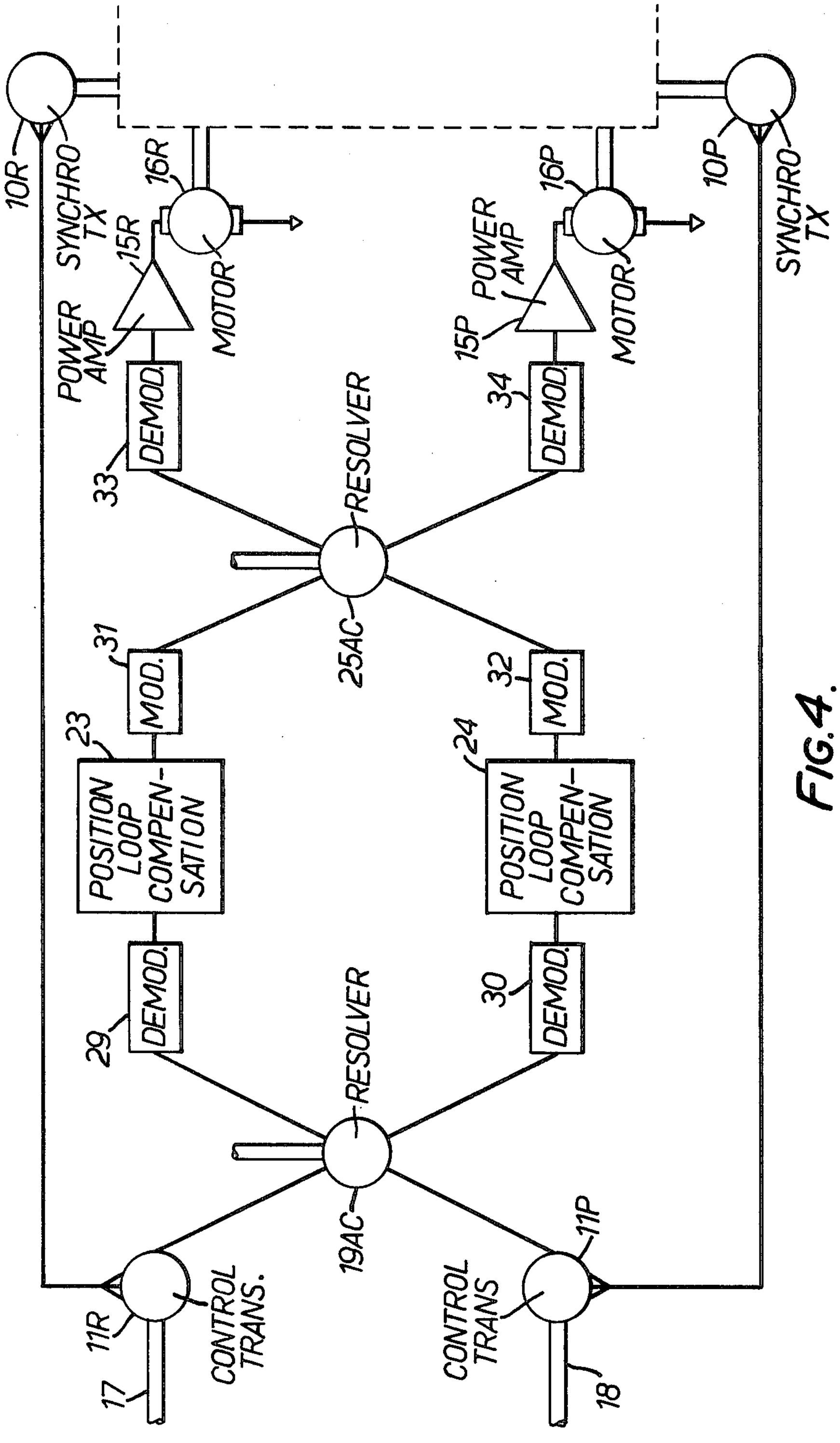
FIG. 4 is a schematic of a modified error detection and correction system using a.c. resolvers.
Figure 5:
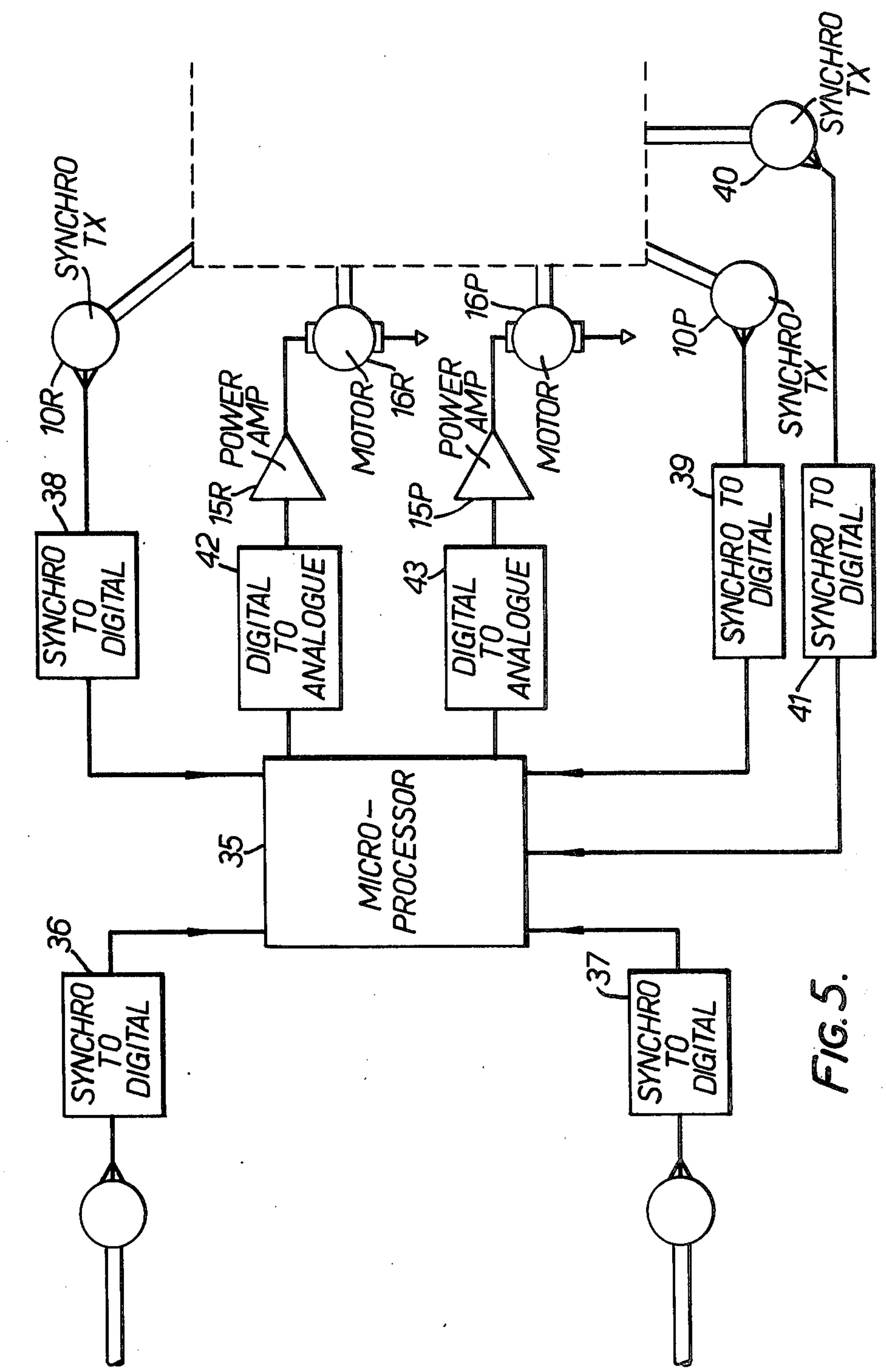
FIG. 5 is a schematic of a still further modified error detection and correction system in accordance with the present invention, using a micro-processor.

The invention is further described with reference to FIGS. 3 to 5 of the accompanying drawings in which, FIG. 3 illustrates one example of error detection and correction system in accordance with the present invention, in which use is made of d.c. resolvers, FIG. 4 is another example of an error detection and correction system in accordance with the present invention, in which use is made of a.c. resolvers and FIG. 5 is a yet further example of an error detection and correction system in accordance with the present invention, in which use is made of a micro-processor.

In FIGS. 3 to 5, like references are used for like parts in FIGS. 1 and 2.

Referring to FIG. 3, in common with FIGS. 4 and 5, a system is illustrated, which avoids the use of separate channels for pitch and roll correction as featured by the known system described hereinbefore with reference to FIGS. 1 and 2. In essence, the stabilising system in accordance with the present invention operates with error signals representative not of pitch and roll as such, but, of elevation and cross-elevation of the antenna 1 of FIG. 1. In other words, the error signals which are produced for use in driving the pitch and roll compensating motors (which are arranged as described with reference to FIG. 1), are associated with an orthogonal frame of reference, which is fixed in relation to and moving with the antenna. The elevation and cross-elevation planes of the antenna 1 of FIG. 1 are represented in dashed outline in FIG. 1 at ABCD and ABEF respectively.

As with the system described with reference to FIG. 2, synchro transmitters 10R and 10P are provided to detect relative movement of the antenna 1 of FIG. 1, about the roll axis 8 and the pitch axis 9 respectively. Output from the roll synchro transmitter 10R is applied to a control transformer 11R, which also derives an input consisting of roll data from the ship's vertical reference unit, which in this case is not represented, although the connection thereto is represented at 17.

Pitch synchro transmitter 10P provides input to a pitch control transformer 11P, which derives an input consisting of pitch data via connection 18 from the ship's vertical reference unit.

Control transformers 11R and 11P are connected to apply a.c. error signals to respective demodulator circuits referenced 13R and 13P respectively.

Demodulators 13R and 13P apply d.c. error signals to an azimuth resolver 19 which is referenced, as represented by the connection 20, to the azimuth axis 2 so as to provide on leads 21 and 22 voltages representing deviations in the elevation and cross-elevation planes respectively of the antenna 1. The voltages on leads 21 and 22 are applied for individual compensation to individual position loop compensation circuits 23 and 24 (each arranged as known per se to provide a degree of damping of the servo control circuit to reduce the possibility of oscillation occurring) and thence to a second azimuth resolver 25 which again is referenced to the azimuth axis 2 of the antenna 1, as represented by the connection 26, so as to provide voltages on lead 27 and 28 which respectively correspond to the torques required for roll and pitch correction respectively about the roll and pitch axes 8 and 9 fixed in the stabilised platform 3 of FIG. 1, in accordance with the azimuth angle of the antenna, i.e. the rotational position of the antenna 1 about the azimuth axis 2.

The d.c. voltages on leads 27 and 28 are applied to individual power amplifiers 15R and 15P respectively, the outputs of which are applied to respective motors 16R and 16P, which are arranged to drive the antenna 1 about the roll axis 8 and the pitch axis 9 in a manner similar to that already described with reference to FIG. 2. In other words, the roll drive motor 16R and the pitch drive motor 16P corresponds to the motors 16 provided in each system utilised by the known arrangement illustrated in FIG. 2.

The operation of the system in accordance with the present invention as illustrated in FIG. 3 may be summarised as follows. Synchro transmitters 10P and 10R measure the orientation of the stabilised platform 1 of FIG. 1 in pitch and roll. Since in practice, the departure of the antenna axis of rotation from the true vertical azimuth axis 2 will be small, the simple resolver 19, after the a.c. signals from synchro transmitters 10P and 10R have been converted from d.c. signals by demodulators 13P and 13R, converts the errors of pitch and roll to errors of elevation and cross-elevation, in accordance with the azimuth angle of the antenna 1.

After compensation in position loop compensating circuits 23 and 24, the second azimuth resolver 25 converts the two voltages, which now represent torques, to correspond to pitch and roll axes fixed in the stabilised platform 3, in accordance with the azimuth angle of the antenna. The pitch axis in the stabilised platform 3 coincides with the pitch axis 9 of the gimbal frame of FIG. 1 and the required torque for compensation for pitch is generated about this axis 9 by the motor 16P positioned to drive the platform 3 with respect to the frame 5 about the axis 9.

However, the roll axis in the stabilised platform 3 is at an angle to the roll axis 8 of the gimbal system, which angle is the pitch angle of the gimbal system itself. In practice, the pitch of the gimbal system, almost equals the pitch of the ship 4 and in fact, the angle between the roll axis in the stabilised platform 3 and the roll axis 8 of the gimbal system rarely exceeds 10°.

The required torque about the roll axis 8 of the gimbal system is generated by motor 16R. The required torque is equal to the product of the generated torque and the cosine of the aforementioned pitch angle of the gimbal system. Since this cosine lies between 1.0 and 0.985, the correction factor involved is negligible. However, the generated torque about the roll axis 8 of the gimbal system also has a component about the azimuth axis 2 equal to the product of the generated torque and the sine of the aforementioned pitch angle of the gimbal system. This sine lies between $-0.174$ and $+0.174$ and thus it may be necessary to allow for this component of the generated torque about the roll axis when determining the required torque about the azimuth axis 2 for rotating the antenna 1 in azimuth for scanning purposes.

In fact the two resolvers 19 and 25 effect co-ordinate conversion or transformation between an orthogonal frame fixed in the stabilized platform 3 and an orthogonal frame fixed in and rotating with the antenna 1. The first resolver 19 is involved with angular errors, whilst the second resolver 25 is concerned with the required driving torques.

Referring to FIG. 4, in this case the resolvers utilised are a.c. resolvers rather than the d.c. resolvers 19 and 25 of FIG. 1. In many respects the system of FIG. 4 is similar to the system of FIG. 3 and like references are used for like parts. The differences will be seen to reside in what may be termed the interface circuitry. In the system of FIG. 4, demodulators between the control transformers 11R and 11P and the first resolver, in this case referenced 19AC to indicate that it is an a.c. resolver, are omitted. Between the resolver 19AC and the position loop compensating circuits 23 and 24, demodulators 29 and 30 are introduced so as to provide a d.c. input to the compensation circuits 23 and 24. Correspondingly, between compensation circuits 23 and 24 and the second resolver, here referenced 25AC again to indicate that it is an a.c. resolver, modulators 31 and 32 are introduced in order to provide a.c. input to the a.c. resolver 25AC. Correspondingly between the resolver 25AC and the power amplifiers 15R and 15P, demodulators 33 and 34 are introduced in order to provide the required d.c. input to the power amplifiers 15R and 15P and the drive motors 16R and 16P.

Referring to FIG. 5, in this case the resolvers 19 and 25 of FIG. 3, and the associated interface circuitry, are replaced by a micro-processor, 35.

As represented the micro-processor 35 receives roll and pitch data from the ship's vertical reference unit via synchro-to-digital converters 36 and 37. Similarly, roll and pitch data from roll and pitch synchro transmitters 10R and 10P is applied to the micro-processor via synchro-to-digital converters 38 and 39. Azimuth data from an azimuth synchro transmitter 40 is applied to the micro-processor 35 via a synchro-to-digital converter 41. Output from the micro-processor 35 to the power amplifiers 15R and 15P (corresponding to power amplifiers 15R and 15P in FIG. 3) is via digital-to-analogue converters 42 and 43 respectively.

Particularly in the embodiment of FIG. 5 using a micro-processor it may be convenient to include a third conversion of fixed to rotating axes, this being in respect of the velocity or rate of movement of the platform about its gimbal axes, for the purpose of providing damping of the servo control system in respect of velocity (i.e. velocity loop compensation) additional to the damping provided by the position loop compensation.

The equations of motion of the antenna system expressed in terms of components relative to a frame rotating with the antenna have the convenience of constant coefficients, because the inertia terms are invariant.

Four advantages may be found to arise from making the stabilisation system operate in channels associated with the rotating frame; firstly mechanical resonances are at fixed frequencies, and so simple notch filters may be used to attenuate excitation at resonant frequencies; secondly the compensation networks can allow for different moments of inertia about the elevation and cross-elevation axes; thirdly the interaction between the two channels is relatively small, and is often removable by a simple bias and fourthly unbalance of the antenna appears as a steady torque and may be readily compensated by a bias voltage generated directly or by integration.

We claim:

1. A control system for stabilising a reference axis about which a member is rotatable, said member being mounted on a body which in operation is subject to angular deviations about two orthogonal axes, said axes being pitch and roll axes, said system comprising means for deriving error signals representative of deviations in pitch and roll of said body, means for converting said error signals representative of deviations in pitch and roll to further error signals representative of angular errors in two orthogonal planes containing said reference axis, and means for generating from said further error signals control signals for use to compensate for deviations of said reference axis due to pitch or roll of said body.

2. An arrangement comprising a member mounted for rotation about a reference axis on a body which in operation is subject to angular deviations about two orthogonal axes, said axes being pitch and roll axes, and a control system for stabilising said reference axis, said control system comprising means for deriving error signals representative of deviations in pitch and roll of said body, means for converting said error signals representative of deviations in pitch and roll to further error signals representative of angular errors in two orthogonal planes containing said reference axis, and means for generating from said further error signals control signals for use to compensate for deviations of said reference axis due to pitch or roll of said body, and means for utilizing said control signals to compensate for such pitch or roll deviations whereby said reference axis tends to be stabilized.

3. A system or arrangement as claimed in claim 2 and wherein said reference axis is ideally vertical and said two orthogonal planes containing said reference axis are elevation and cross-elevation planes.

4. An arrangement as claimed in claim 2 and wherein said rotatable member is a scanning radio or radar antenna.

5. An arrangement as claimed in claim 2 and wherein said body upon which said rotatable member is mounted is a stabilisable platform which is mounted for movement about its pitch and roll axes and supported by carrier means having means for attachment to a craft, and said means for utilising said control signals for compensating for deviations of said reference axis due to pitch or roll of said body comprises means for driving said stabilised platform about said pitch and roll axes.

6. An arrangement as claimed in claim 5 and wherein said stabilisable platform is mounted in a double gimbal system carried by said carrier means, one gimbal axis corresponding to said pitch axis and the other gimbal axis corresponding to said roll axis.

7. An arrangement as claimed in claim 5 and wherein said craft is a sea going vessel having a vertical reference unit, and said rotatable member is an antenna scannable in azimuth and rotatably mounted on a stabilisable platform, and means are provided for determining the orientation of said stabilised platform in pitch and roll, comparison means are provided for comparing signals representing the orientation of said platform in pitch and roll with pitch and roll data derived from said ship's vertical reference unit to provide signals representative of angular deviations in pitch and roll of said platform relative to earth, means are provided for resolving said last mentioned pitch and roll deviation signals to signals representative of deviations in the elevation and cross-elevation planes of said antenna and means are provided for resolving said last mentioned deviation signals into signals representative of the torques required to be applied about the pitch and roll axes of the platform to provide compensation for pitch and roll of said platform.

8. An arrangement as claimed in claim 7 and wherein said resolving means comprises azimuth resolvers referenced to the vertical rotational axis of said antenna.

9. An arrangement as claimed in claim 7 and wherein said resolving means are embodied as a micro-processor, synchro-to-digital converters being provided to translate the input thereto to digital signals and digital-to-analogue converters being provided to translate the digital output signals therefrom to analogue control signals, as required.

10. An arrangement as claimed in claim 7 and wherein prior to said second mentioned resolving means, position loop compensation means are provided to provide a degree of damping of the control system and reduce any tendency for oscillation to occur.

11. An arrangement as claimed in claim 7 and wherein velocity loop compensation means are provided.

* * * * *